United States Patent
Robertson et al.

(10) Patent No.: US 10,293,931 B2
(45) Date of Patent: May 21, 2019

(54) AIRCRAFT GENERATING A TRIAXIAL DYNAMIC THRUST MATRIX

(71) Applicant: Bell Helicopter Textron Inc., Fort Worth, TX (US)

(72) Inventors: Daniel Bryan Robertson, Fort Worth, TX (US); Kirk Landon Groninga, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 339 days.

(21) Appl. No.: 15/253,449

(22) Filed: Aug. 31, 2016

(65) Prior Publication Data

US 2018/0057160 A1 Mar. 1, 2018

(51) Int. Cl.
| | |
|---|---|
| *B64C 29/00* | (2006.01) |
| *B64C 39/00* | (2006.01) |
| *B64C 23/02* | (2006.01) |
| *B64C 29/02* | (2006.01) |
| *B64C 39/12* | (2006.01) |

(52) U.S. Cl.
CPC .......... *B64C 29/0033* (2013.01); *B64C 23/02* (2013.01); *B64C 29/02* (2013.01); *B64C 39/005* (2013.01); *B64C 39/006* (2013.01); *B64C 39/12* (2013.01)

(58) Field of Classification Search
CPC ..... B64C 23/02; B64C 29/0033; B64C 29/02; B64C 29/04; B64C 39/003; B64C 39/005; B64C 39/006; B64C 39/08; B64D 27/06; B64D 27/12; B64D 27/18

USPC .............................................. 244/12.4, 35 A
See application file for complete search history.

(56) References Cited

U.S. PATENT DOCUMENTS

| | | | |
|---|---|---|---|
| 1,487,228 A | 3/1924 | Emilio | |
| 1,666,132 A * | 4/1928 | Gallet | B64C 39/005 244/12.1 |
| 1,936,786 A * | 11/1933 | Gebhert | B64C 23/005 244/45 R |

(Continued)

FOREIGN PATENT DOCUMENTS

| | | |
|---|---|---|
| CN | 204674831 U | 9/2015 |
| CN | 104276284 B | 4/2016 |

(Continued)

*Primary Examiner* — Richard R. Green
*Assistant Examiner* — Brady W Frazier
(74) *Attorney, Agent, or Firm* — Lawrence Youst PLLC

(57) ABSTRACT

A tri-wing aircraft includes a fuselage having a longitudinally extending fuselage axis. Three wings extend generally radially outwardly from the fuselage axis and are circumferentially distributed generally uniformly about the fuselage at approximately 120-degree intervals. The wings have airfoil cross-sections including first and second surfaces having chordwise channels therebetween. A distributed propulsion system includes a plurality of propulsion assemblies. Each propulsion assembly includes a variable thrust cross-flow fan disposed within one of the chordwise channels of one of the wings. At least two variable thrust cross-flow fans are disposed within the chordwise channels of each of the wings. A flight control system is operably associated with the distributed propulsion system such that the flight control system and the distributed propulsion system are operable to generate a triaxial dynamic thrust matrix.

19 Claims, 12 Drawing Sheets

(56) References Cited

U.S. PATENT DOCUMENTS

| | | | | |
|---|---|---|---|---|
| 2,402,311 | A | * | 6/1946 | Bissett .................... B64C 39/00 244/13 |
| 2,444,781 | A | * | 7/1948 | Leonard .................. B64C 29/02 244/7 B |
| 2,479,125 | A | * | 8/1949 | Leonard ............. B64C 29/0075 244/102 R |
| 2,526,941 | A | * | 10/1950 | Fishbein ................ B64D 27/12 244/15 |
| 2,604,276 | A | * | 7/1952 | Huben ................... B64D 27/06 244/15 |
| 2,866,608 | A | * | 12/1958 | Leonard ............. B64C 29/0075 244/7 B |
| 3,059,876 | A | | 10/1962 | Platt |
| 3,159,361 | A | * | 12/1964 | Weiland ................... B60V 1/14 114/279 |
| 3,178,131 | A | * | 4/1965 | Laing ..................... B64C 23/02 244/15 |
| 3,212,735 | A | | 10/1965 | Nikolaus |
| 4,165,058 | A | * | 8/1979 | Whitener ................ B64C 39/08 244/15 |
| 4,194,707 | A | * | 3/1980 | Sharpe .................. B64C 3/141 244/12.3 |
| 5,100,080 | A | | 3/1992 | Servanty |
| 5,176,338 | A | * | 1/1993 | Silich .................... B64C 1/0009 244/120 |
| 5,205,512 | A | | 4/1993 | Rumberger |
| 5,265,827 | A | | 11/1993 | Gerhardt |
| 5,289,994 | A | * | 3/1994 | Del Campo Aguilera ................... B64C 27/22 244/12.1 |
| 6,007,021 | A | | 12/1999 | Tsepenyuk |
| 7,518,864 | B2 | | 4/2009 | Kimura |
| 7,594,625 | B2 | | 9/2009 | Robertson et al. |
| 7,641,144 | B2 | | 1/2010 | Kummer et al. |
| 7,654,486 | B2 | * | 2/2010 | Milde, Jr. ............... B64C 27/20 244/12.3 |
| 7,731,121 | B2 | | 6/2010 | Smith et al. |
| 7,931,233 | B2 | | 4/2011 | Arafat et al. |
| 8,469,308 | B2 | | 6/2013 | Robertson et al. |
| 8,596,570 | B1 | | 12/2013 | Carambat |
| 8,636,243 | B2 | | 1/2014 | Robertson |
| 8,727,265 | B2 | | 5/2014 | Kltmikus et al. |
| 9,260,185 | B2 | | 2/2016 | Covington et al. |
| 9,409,643 | B2 | | 8/2016 | Mores et al. |
| 9,452,832 | B2 | | 9/2016 | Heid |
| 9,789,959 | B2 | * | 10/2017 | Prisell .................... B64C 15/02 |
| 2006/0054736 | A1 | | 3/2006 | Milde |
| 2006/0151666 | A1 | * | 7/2006 | VanderMey ........ B64C 29/0016 244/12.3 |
| 2006/0249621 | A1 | | 11/2006 | Stephens |
| 2007/0200029 | A1 | | 8/2007 | Sullivan |
| 2011/0121128 | A1 | | 5/2011 | Balkus, Jr. |
| 2011/0315809 | A1 | * | 12/2011 | Oliver ................. B64C 29/0033 244/12.4 |
| 2012/0091257 | A1 | | 4/2012 | Wolff et al. |
| 2012/0111994 | A1 | * | 5/2012 | Kummer .................. B63G 8/18 244/15 |
| 2012/0256042 | A1 | | 10/2012 | Altmikus et al. |
| 2012/0312916 | A1 | | 12/2012 | Groninga |
| 2013/0026303 | A1 | | 1/2013 | Wang |
| 2013/0119186 | A1 | | 5/2013 | Heid |
| 2015/0048214 | A1 | | 2/2015 | Bockmiller et al. |
| 2015/0183518 | A1 | * | 7/2015 | Stuckl ..................... B64C 3/10 244/13 |
| 2015/0191245 | A1 | | 7/2015 | Mores et al. |
| 2015/0197335 | A1 | | 7/2015 | Dekel et al. |
| 2015/0225071 | A1 | * | 8/2015 | Tighe ..................... B64C 29/02 244/12.4 |
| 2015/0314865 | A1 | | 11/2015 | Bermond et al. |
| 2016/0016652 | A1 | * | 1/2016 | Barrett .................... B64C 25/06 244/15 |
| 2016/0214710 | A1 | | 7/2016 | Brody et al. |
| 2017/0003690 | A1 | | 1/2017 | Tanahashi |
| 2017/0152935 | A1 | | 6/2017 | Filter et al. |
| 2017/0361927 | A1 | * | 12/2017 | Lavagen ................. A63H 27/12 |

FOREIGN PATENT DOCUMENTS

| | | | | |
|---|---|---|---|---|
| EP | 2511177 | A1 | | 10/2012 |
| FR | 636843 | A | | 4/1928 |
| FR | 880130 | A | * 3/1943 | ............ B64C 23/02 |
| FR | 2375090 | A1 | | 7/1978 |
| GB | 885663 | A | | 12/1961 |
| GB | 2316374 | A | | 2/1998 |
| JP | 2009051381 | A | | 3/2009 |

\* cited by examiner

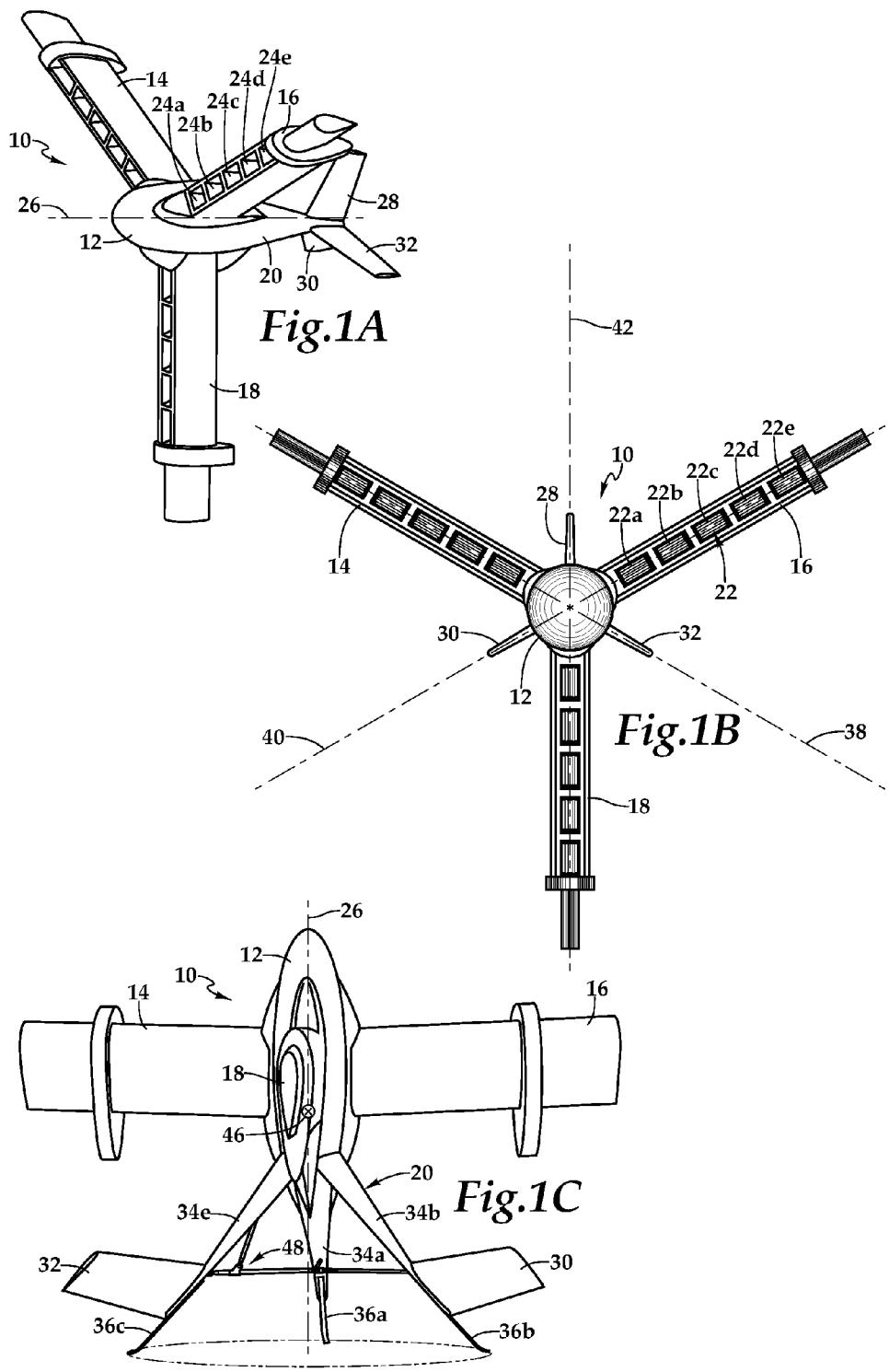

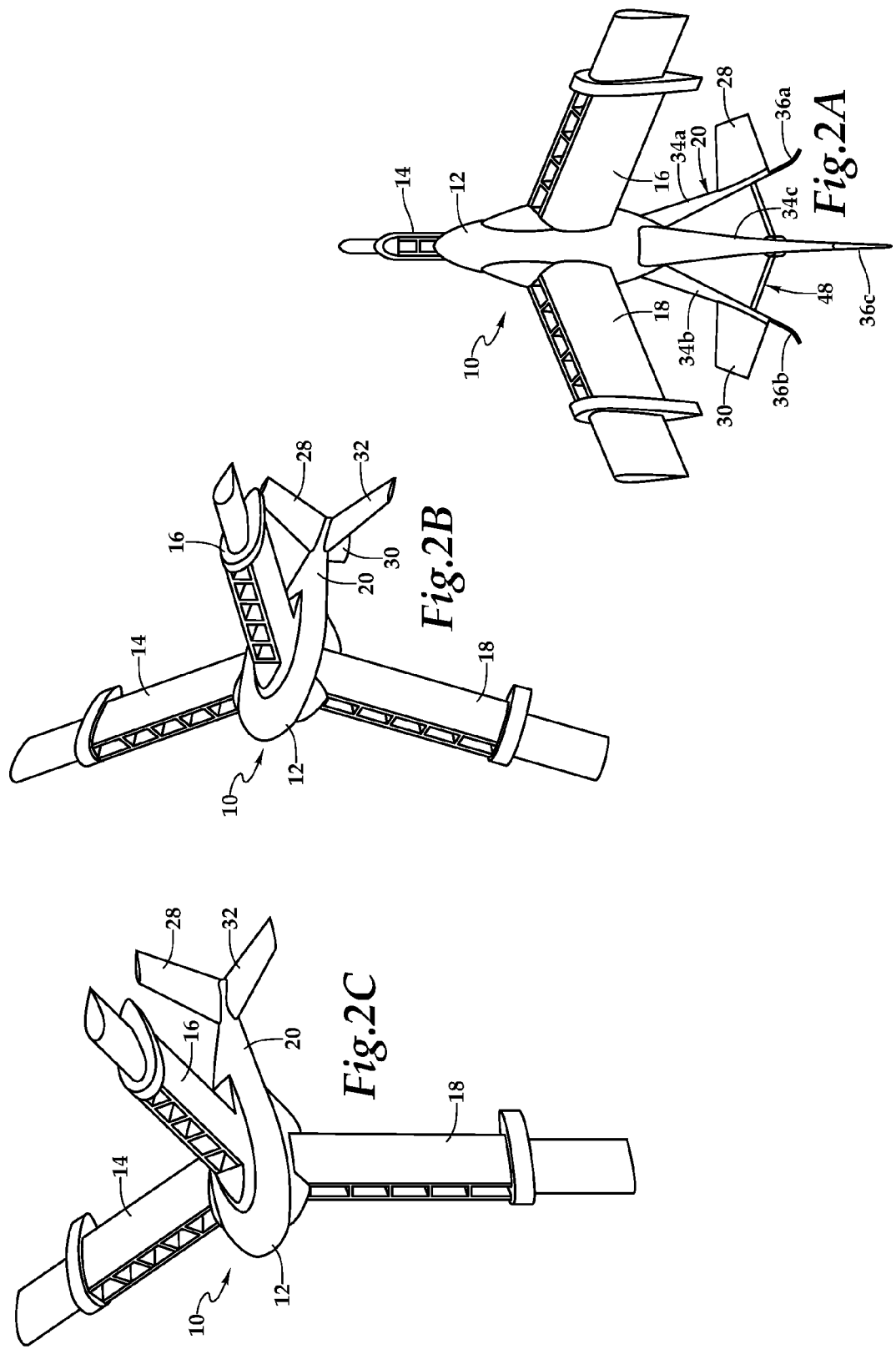

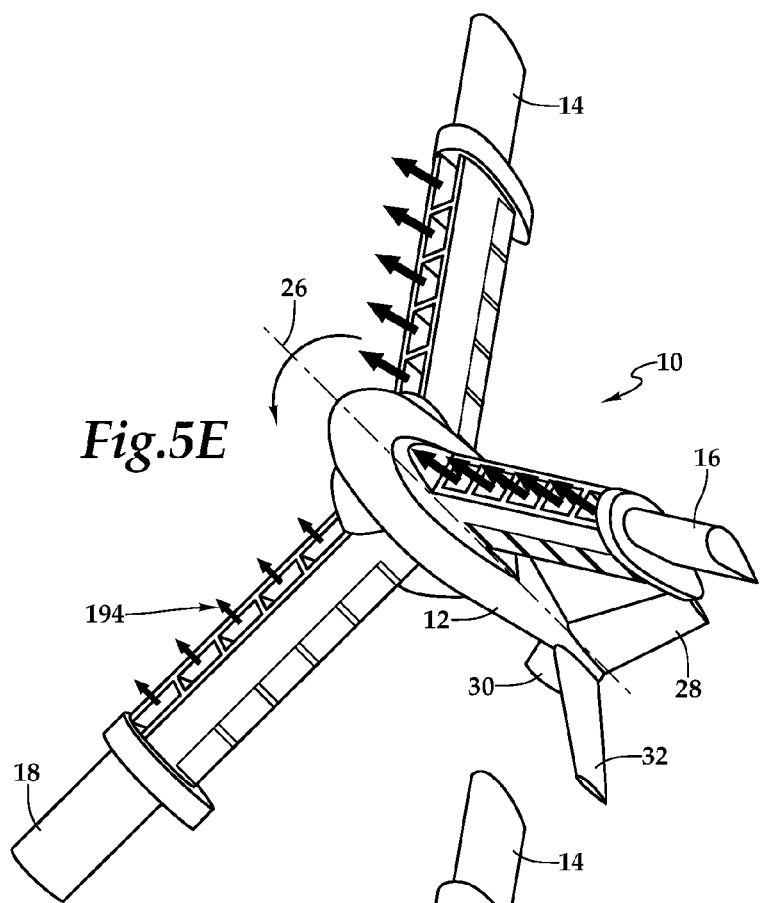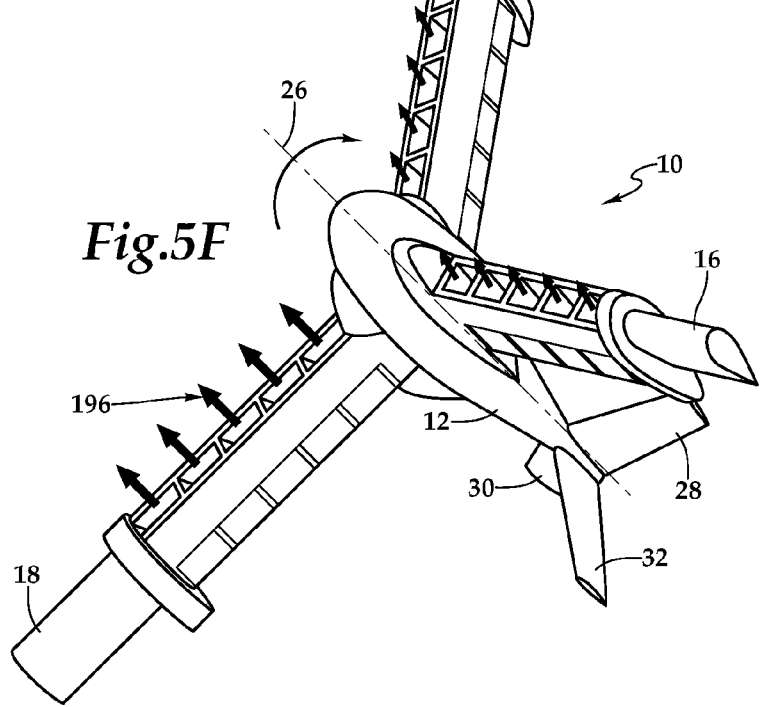

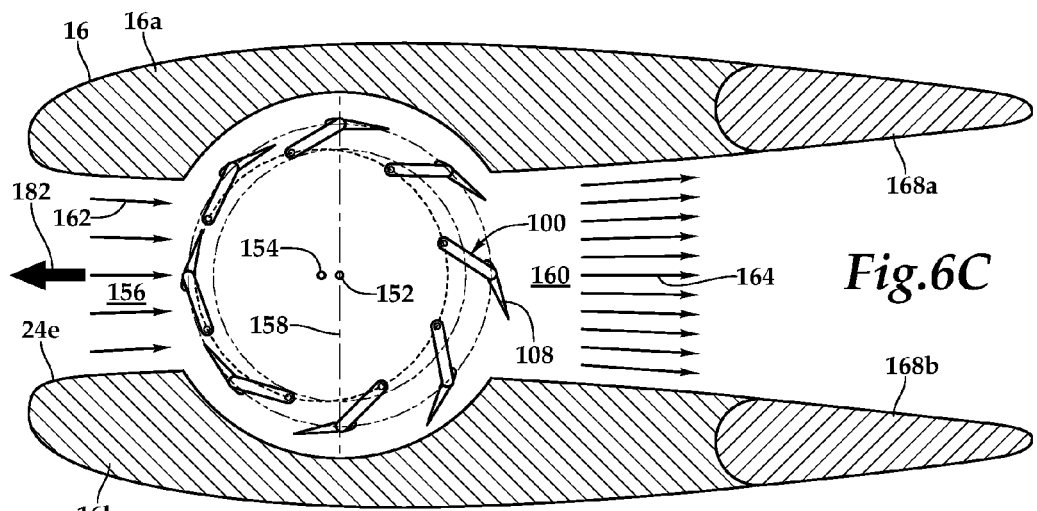
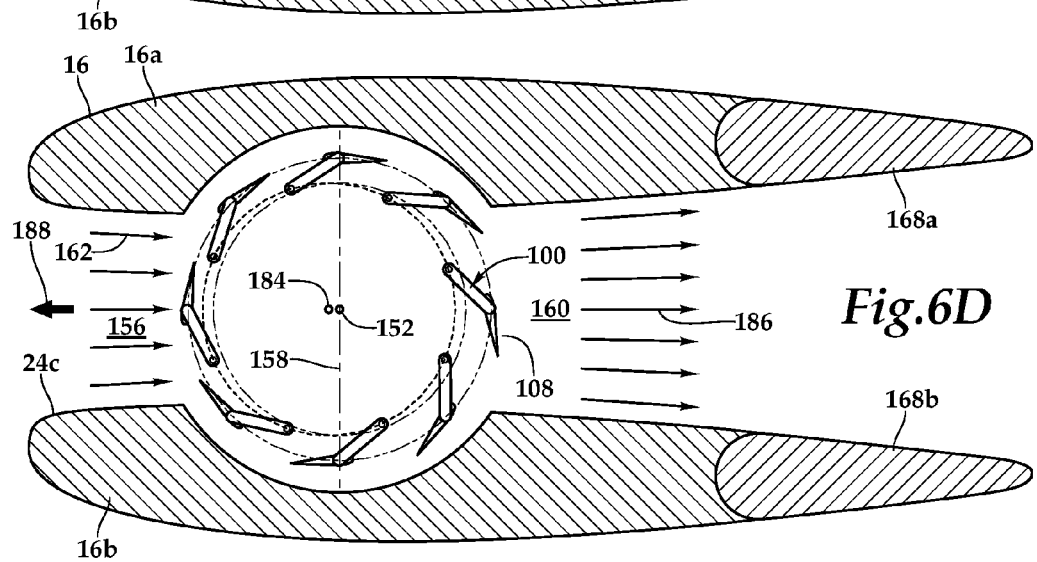
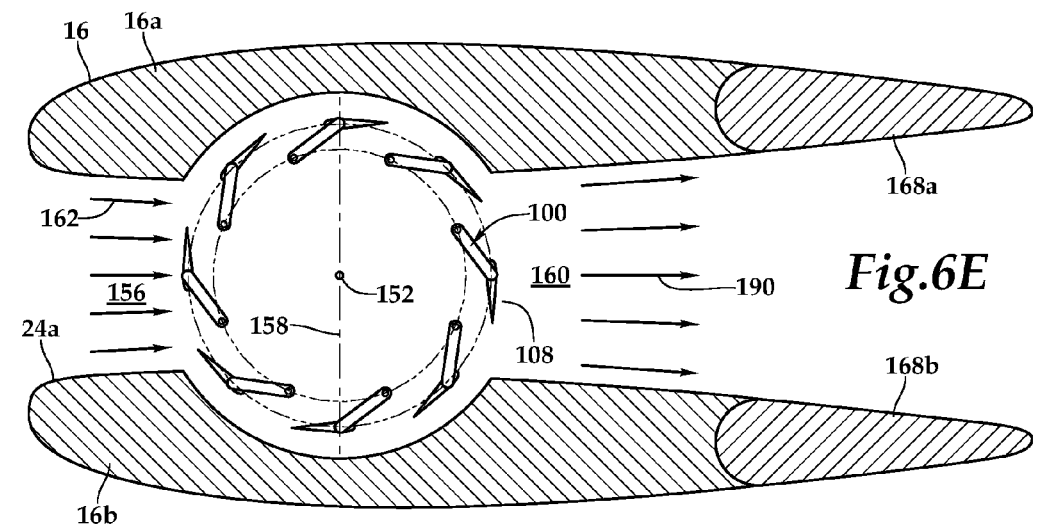

AIRCRAFT GENERATING A TRIAXIAL DYNAMIC THRUST MATRIX

TECHNICAL FIELD OF THE DISCLOSURE

The present disclosure relates, in general, to aircraft operable to transition between a forward flight mode and a vertical takeoff and landing mode and, in particular, to aircraft having a flight control system and a distributed propulsion system operable to generate a triaxial dynamic thrust matrix.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the airplane in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable, forward, backward and lateral flight. These attributes make helicopters highly versatile for use in congested, isolated or remote areas where fixed-wing aircraft may be unable to takeoff and land. Helicopters, however, typically lack the forward airspeed of fixed-wing aircraft.

A tiltrotor aircraft is another example of a VTOL aircraft. Tiltrotor aircraft generate lift and propulsion using proprotors that are typically coupled to nacelles mounted near the ends of a fixed wing. The nacelles rotate relative to the fixed wing such that the proprotors have a generally horizontal plane of rotation for vertical takeoff, hovering and landing and a generally vertical plane of rotation for forward flight, wherein the fixed wing provides lift and the proprotors provide forward thrust. In this manner, tiltrotor aircraft combine the vertical lift capability of a helicopter with the speed and range of fixed-wing aircraft. Tiltrotor aircraft, however, typically suffer from downwash inefficiencies during vertical takeoff and landing due to interference caused by the fixed wing.

A further example of a VTOL aircraft is a tiltwing aircraft that features a rotatable wing that is generally horizontal for forward flight and rotates to a generally vertical orientation for vertical takeoff and landing. Propellers are coupled to the rotating wing to provide the required vertical thrust for takeoff and landing and the required forward thrust to generate lift from the wing during forward flight. The tiltwing design enables the slipstream from the propellers to strike the wing on its smallest dimension, thus improving vertical thrust efficiency as compared to tiltrotor aircraft. Tiltwing aircraft, however, are more difficult to control during hover as the vertically oriented wing provides a large surface area for crosswinds, typically requiring tiltwing aircraft to have either cyclic rotor control or an additional thrust station to generate a moment.

SUMMARY

In a first aspect, the present disclosure is directed to an aircraft including a fuselage having a longitudinally extending fuselage axis. At least three wings extend from and are circumferentially distributed about the fuselage. The wings have airfoil cross-sections including first and second surfaces having chordwise channels therebetween. A distributed propulsion system includes a plurality of propulsion assemblies. Each propulsion assembly includes a propulsion unit disposed within one of the chordwise channels of one of the wings. A flight control system is operably associated with the distributed propulsion system.

In some embodiments, the wings may extend generally radially outwardly from the fuselage axis. In certain embodiments, three wings may be circumferentially distributed generally uniformly about the fuselage at approximately 120-degree intervals. In some embodiments, the propulsion units may be electrically powered propulsion units and/or cross-flow fans such as variable thrust cross-flow fans that may include a cross-flow fan assembly having a longitudinal axis and including first and second driver plates having a plurality of blades rotatably mounted therebetween. The blades may be disposed radially outwardly from the longitudinal axis such that the blades have a generally circular path of travel when the cross-flow fan assembly rotates about the longitudinal axis. The plurality of blades is moveable between a plurality of pitch angle configurations. A control assembly coupled to the plurality of blades is operable to change the pitch angle configuration of the plurality of blades to generate variable thrust.

In some embodiments, the distributed propulsion system may include at least two propulsion units disposed within the chordwise channels of each wing. In other embodiments, the distributed propulsion system may include at least four propulsion units disposed within the chordwise channels of each wing. In certain embodiments, the flight control system and the distributed propulsion system may be operable to generate a dynamic thrust matrix, such as a triaxial dynamic thrust matrix, wherein the flight control system may have independent control over a thrust magnitude and a thrust vector of each propulsion assembly. In these embodiments, adjustments to the dynamic thrust matrix may be operable to transition the aircraft between a vertical takeoff and landing mode and a forward flight mode, maintain the aircraft in a stable hover, perform lateral transitions in vertical takeoff and landing mode, provide roll control during forward flight and/or enhance aircraft endurance during forward flight.

In a second aspect, the present disclosure is directed to a tri-wing aircraft. The tri-wing aircraft includes a fuselage having a longitudinally extending fuselage axis. Three wings extend generally radially outwardly from the fuselage axis and are circumferentially distributed generally uniformly about the fuselage at approximately 120-degree intervals. The wings have airfoil cross-sections including first and second surfaces having chordwise channels therebetween. A distributed propulsion system includes a plurality of propulsion assemblies. Each propulsion assembly includes a variable thrust cross-flow fan disposed within one of the chordwise channels of one of the wings. At least two variable thrust cross-flow fans are disposed within the chordwise channels of each of the wings. A flight control system is operably associated with the distributed propulsion system such that the flight control system and the distributed propulsion system are operable to generate a triaxial dynamic thrust matrix.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 1A-1C are schematic illustrations of an aircraft operable to generate a triaxial dynamic thrust matrix in accordance with embodiments of the present disclosure;

FIGS. 2A-2F are schematic illustrations of an aircraft operable to generate a triaxial dynamic thrust matrix in a sequential flight operating scenario in accordance with embodiments of the present disclosure;

FIGS. 5A-5G are schematic illustrations of an aircraft operable to generate a triaxial dynamic thrust matrix during various maneuvers in accordance with embodiments of the present disclosure;

FIGS. 6A-6E are cross sectional views of a wing for use in an aircraft operable to generate a triaxial dynamic thrust matrix in accordance with embodiments of the present disclosure.

DETAILED DESCRIPTION

Figure 2D:
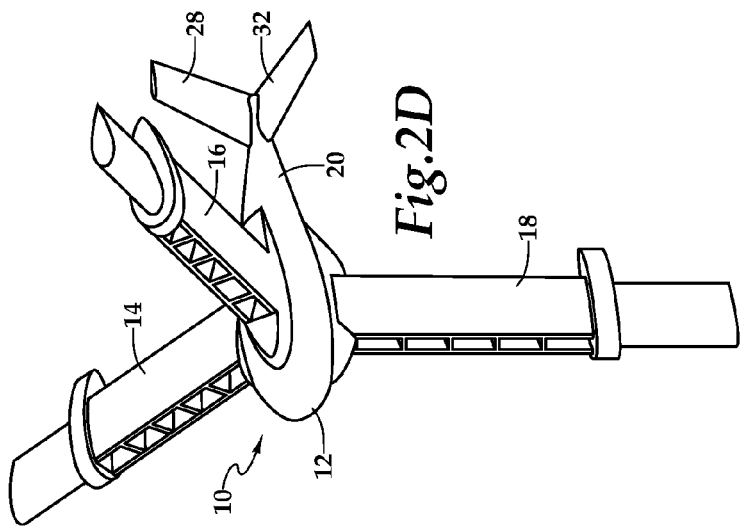

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring to FIGS. 1A-1C in the drawings, an aircraft operable to generate a triaxial dynamic thrust matrix is schematically illustrated and generally designated 10. Aircraft 10 includes a fuselage 12 having three wings 14, 16, 18 distributed thereabout at approximately 120-degree intervals and a tailboom assembly 20 extending from an aft portion thereof. Preferably, wings 14, 16, 18 each have an airfoil cross-section operable to generate lift responsive to the forward airspeed of aircraft 10 and form the main lifting surface of aircraft 10. Aircraft 10 may be an unmanned aircraft system (UAS), also known as an unmanned aerial vehicle (UAV) or a drone, that is self-powered, does not carry a human operator, uses aerodynamic forces to provide vehicle lift, is autonomously and/or remotely operated, may be expendable or recoverable and may carry lethal or nonlethal payloads. In such an embodiment, aircraft 10 may be used in military, commercial, scientific, recreational and other applications. In addition, groups of aircraft, similar or identical to aircraft 10, may be networked together such that they are capable of cooperating with one another and exhibiting swarm behavior including, for example, the ability to dynamically adapt responsive to changing conditions or parameters, the ability for group coordination, distributed control, distributed tactical group planning, distributed tactical group goals, distributed strategic group goals and/or fully autonomous swarming. Alternatively, aircraft 10 could be a manned aircraft operable for onboard pilot control over some or all aspects of flight operations.

Aircraft 10 has a propulsion system depicted as a distributed propulsion system 22 including a plurality of propulsion assemblies embedded within chordwise channels of wings 14, 16, 18. For example, propulsion assemblies 22A-22E (see FIG. 1B) are located in chordwise channels 24A-24E in wing 16 (see FIG. 1A). As illustrated, air enters propulsion assemblies 22A-22E from a forward intake portion of a respective chordwise channel 24A-24E and exits propulsion assemblies 22A-22E into an aft discharge portion of the respective chordwise channel 24A-24E, thereby generating thrust generally parallel to a longitudinal fuselage axis 26. The aft portions of chordwise channels may include flaperons or other flow directing members to enable thrust vectoring. Propulsion assemblies 22A-22E may preferably include propulsion units in the form of cross-flow fans having variable thrust capacities that may be operated independent of one another. Cross-flow fans of the present disclosure may be operated responsive to one or more drives systems including engines in the form of battery or fuel cell powered electrical motors, hydraulic motors and/or liquid fuel powered engines. Two or more cross-flow fans may be operated on a common drive shaft or each cross-flow fan may be operated by a unique drive system. Preferably, variable thrust control for each cross-flow fan is independently adjusted with a dedicated actuator, however, more than one cross-flow fan may be coupled to a common actuator for common variable thrust control. A flight control system of aircraft 10 and distributed propulsion system 22 are operable to generate a dynamic thrust matrix, as discussed herein. In the illustrated embodiment, the dynamic thrust matrix is a triaxial dynamic thrust matrix providing thrust management relative to three axes 38, 40, 42.

Tailboom assembly 20 includes a plurality of control surfaces used during forward flight depicted as rudder 28 for yaw control and elevators 30, 32 for pitch control, in the illustrated configuration. It is noted that aircraft 10 may fly in other orientations wherein the control surfaces may serve alternate functions. For example, if wings 16, 18 are above fuselage 12 and wing 14 is below fuselage 12, then control surface 32 would operate as the rudder and control surfaces 28, 30 would operate as the elevators. In addition, even though aircraft 10 is depicted and described as having three wings that are circumferentially distributed uniformly about fuselage 12, it should be understood by those having ordinary skill in the art that an aircraft of the present disclosure could have other numbers of wings both greater than and less than three and/or have wings that are oriented in a nonuniform manner. In the present example, instead of wings 14, 16, 18 being oriented at 120-degree circumferential intervals (120/120/120), the wings could be oriented as 105/150/105, 90/180/90 or other desired wing orientation permutation. Also, even though control surface 28, 30, 32 are depicted as being circumferentially offset from wings 14, 16, 18 by 60 degrees, it should be understood by those having ordinary skill in the art that control surfaces for an aircraft of the present disclosure could have other orientations relative to the wings including being circumferentially inline with the wings. Further, even though the same number of wings and control surfaces has been depicted, it should be understood by those skilled in the art that the number of control surfaces and the number of wings are independent of each other.

In the illustrated embodiment, tailboom assembly 20 includes a plurality of tail arms 34A-34C that are operable to be radially retracted in forward flight, as best seen in FIG. 1A, forming a small tail surface geometry wherein control surfaces 28, 30, 32 provide yaw and pitch control. In addition, tail arms 34A-34C are operable to be radially extended for landing, as best seen in FIG. 1C, forming a stable ground contact base. As illustrated, each tail arm 34A-34C includes one of the control surface 28, 30, 32 and a landing member 36A-36C such as a fixed or retractable skid member or a shock absorbing member such as a pneumatic shock strut or mechanical spring assembly. Landing members 36A-36C may also include wheels to assist in ground maneuvers. The length of tail arms 34A-34C as well as the angle tail arms 34A-34C make with longitudinal fuselage axis 26 in the landing configuration may be determined based upon the location of the center of gravity 46 of aircraft 10. Preferably, center of gravity 46 should be located within the tip over angle from the ground contact base of landing member 36A-36C, indicated by the dashed circle, wherein the tip over angle may be about 55 degrees. Tailboom assembly 20 includes an actuator assembly 48 operable to transition tail arms 34A-34C between the forward flight configuration and the landing configuration. Tail arms 34A-34C may also include one more sensors that indicate the position of tail arms 34A-34C such as the fully retracted and the fully deployed positions, as well as fault positions if tail arms 34A-34C fail to reach the fully retracted and/or the fully deployed positions. Tail arms 34A-34C may also include a fail safe mechanism to bias tail arms 34A-34C toward the landing configuration in the event of a tail arm fault.

Referring next to FIGS. 2A-2F in the drawings, a sequential flight-operating scenario of aircraft 10 is depicted. Aircraft 10 may be a manned or unmanned aircraft and may be operated responsive to onboard pilot flight control, remote flight control or autonomous flight control. Aircraft 10 is preferably a fly-by-wire aircraft including an onboard flight control computing system, such as a digital flight control computer, that may be referred to herein as a flight control system. The flight control system may be operable to receive sensor data from and send flight commands to controller associated with the propulsion assemblies, flaperons, control surfaces, tailboom actuator assembly, landing member actuator, other systems and the like. Preferably, the flight control system is operable to individually and independently control and operate each of the propulsion assemblies.

As best seen in FIG. 2A, aircraft 10 is in its vertical takeoff and landing configuration. Preferably, all propulsion assemblies are operating to provide maximum thrust and control during vertical takeoff and hover operations. As aircraft 10 continues its vertical assent to a desired elevation, as discussed herein, it may begin the transition from the vertical takeoff and landing configuration toward the forward flight configuration. As best seen in FIG. 2B, as aircraft 10 transitions from vertical takeoff and landing mode to forward flight mode, tailboom actuator assembly 48 radially retracts tail arms 34A-34C such that tailboom 20 has a reduced tail surface geometry. Aircraft 10 also begins to transition its longitudinal fuselage axis 26 from the vertical attitude toward the horizontal attitude by adjusting the thrust output of individual propulsion assemblies and/or thrust vectoring, as discussed herein. As best seen in FIG. 2C, aircraft 10 has completed the transition to forward flight mode. During forward flight, it may be desirable to maximize flight efficiency, which in turn increases the endurance of aircraft 10. One way to increase efficiency is to fly aircraft 10 in a single wing down configuration, in this case wing 18, with wings 14, 16 extending upwardly at approximately 30 degrees relative to a horizontal axis. In the illustrated embodiment, this position results in desirably oriented control surfaces depicted as rudder 28 for yaw control and elevators 30, 32 for pitch control. In addition, once aircraft 10 is in the forward flight mode, the thrust requirements are reduced compared to the thrust requirements of vertical takeoff, hovering and vertical landing. Accordingly, in forward flight mode, the thrust output of one or more of the propulsion assemblies may be reduced. Alternatively or additionally, one or more of the propulsion assemblies may be shut down during forward flight.

Figure 2E:
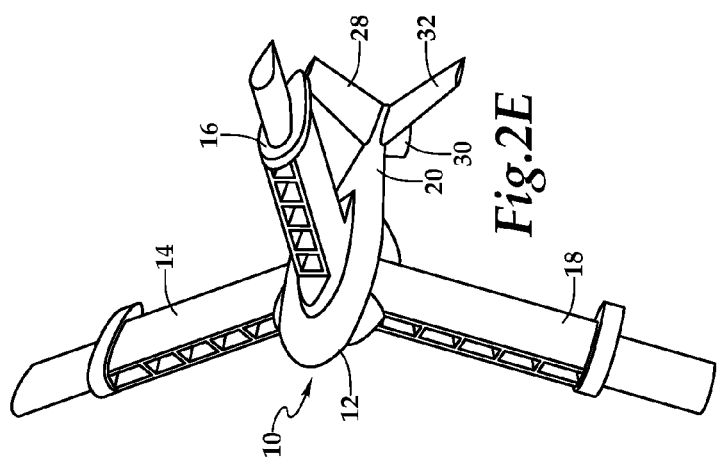
Figure 2F:
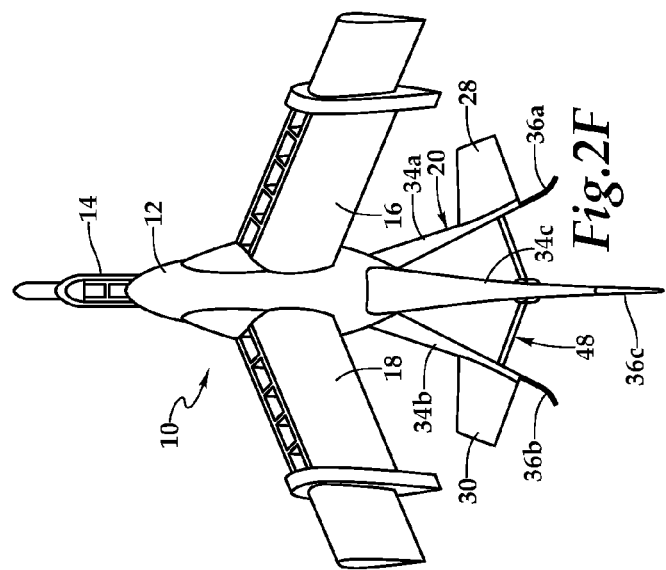

Continuing with the current example, as aircraft 10 approaches the destination, all propulsion assemblies are preferably reengaged to provide full propulsion capabilities while remaining in forward flight mode, as best seen in FIG. 2D. Thereafter, aircraft 10 may begin its transition from forward flight mode to vertical takeoff and landing mode, as best seen in FIG. 2E, wherein longitudinal fuselage axis 26 shifts from the horizontal attitude toward the vertical attitude by adjusting the thrust output of individual propulsion assemblies and/or thrust vectoring, as discussed herein. As aircraft 10 continues its vertical descent, as best seen in FIG. 2F, tailboom actuator assembly 48 radially extends tail arms 34A-34C such that tailboom 20 forms a stable ground contact base. In addition, tailboom actuator assembly 48 may deploy landing members 36A-36C, if they were retracted during forward flight mode.

Figure 3A:
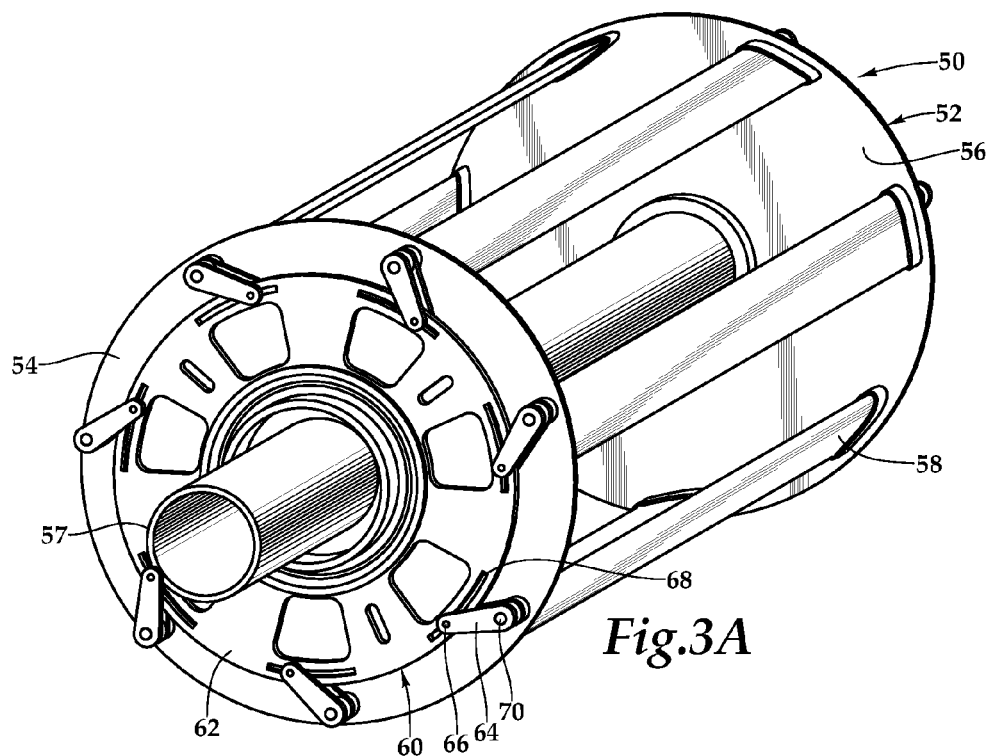
FIGS. 3A-3C are various views of a variable thrust cross-flow fan system for use in an aircraft operable to generate a triaxial dynamic thrust matrix in accordance with embodiments of the present disclosure.
Figure 3B:
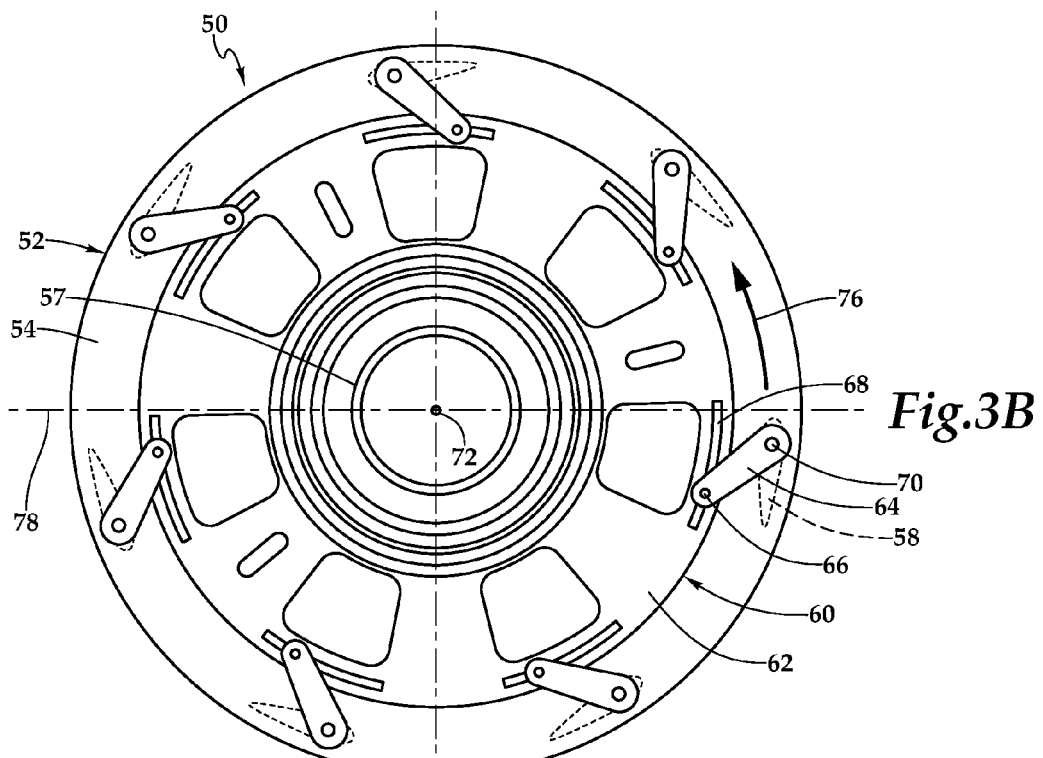
Figure 3C:
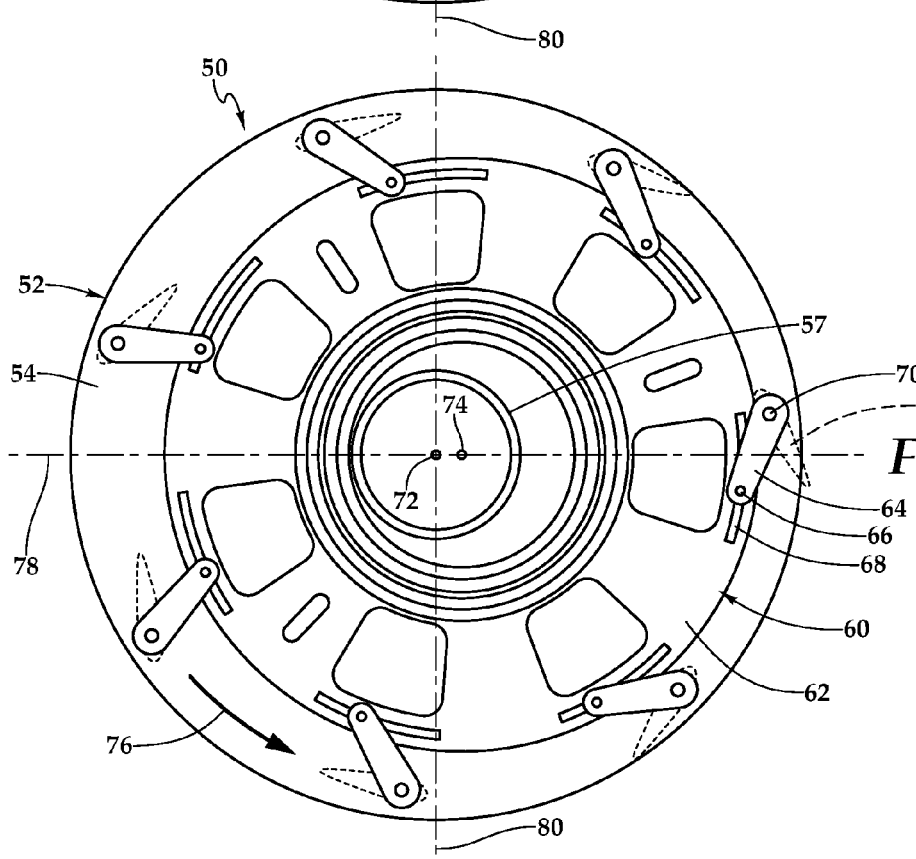

Referring to FIGS. 3A-3C of the drawings, a propulsion unit for use in a propulsion assembly of the present disclosure is depicted as variable thrust cross-flow fan 50. Variable thrust cross-flow fan 50 includes a cross-flow fan assembly 52 including driver plates 54, 56 which are coupled to and are rotatable about a longitudinal axis by a drive shaft 57. Drive shaft 57 is part of a drive system used to provide rotational energy to cross-flow fan assembly 52 and is preferably coupled to an electrically operated engine controlled by the flight control system of aircraft 10. Cross-flow fan assembly 52 includes a plurality of blades 58 that are each rotatably coupled between driver plates 54, 56. As illustrated, blades 58 are disposed radially outwardly from the longitudinal axis such that blades 58 follow a generally circular path of travel when cross-flow fan assembly 52 rotates about the longitudinal axis. Variable thrust cross-flow fan 50 includes a control assembly 60 that is coupled to each blade 58. Control assembly 60 is part of an actuation system used to adjust the thrust output of cross-flow fan assembly 52 and is preferably coupled to an electrically operated actuator controlled by the flight control system of aircraft 10. In the illustrated embodiment, control assembly 60 includes a control cam 62 that is rotatable with and translatable relative to cross-flow fan assembly 52. Control assembly 60 also includes a plurality of linkages 64 that are slidably coupled to control cam 62 via follower pins 66 in follower slots 68 of driver plate 54 and fixably coupled to blades 58 via driver pins 70 that extend through linkage holes (not visible) of driver plate 54.

When cross-flow fan assembly 52 is rotated by drive shaft 57 and control cam 62 is positioned concentrically with cross-flow fan assembly 52, as best seen in FIG. 3B, follower pins 66 do not move relative to follower slots 68 and blades 58 do not rotate relative to driver plates 54, 56. In this state, blades 58 are in a neutral configuration wherein blades 58 have a substantially zero pitch during the entire revolution of cross-flow fan assembly 52. In this neutral configuration, blades 58 have a substantially zero angle of attack and therefore produce little or no thrust. To produce thrust, blades 58 are rotated relative to driver plates 54, 56 in response to shifting control cam 62 aft, in the chordwise direction of the wing, relative to cross-flow fan assembly 52, as best seen in FIG. 3C. When control cam 62 is position eccentrically relative to cross-flow fan assembly 52 and cross-flow fan assembly 52 is rotated by drive shaft 57, follower pins 66 cyclically slide within follower slots 68 which cyclically pivots linkages 64 and cyclically rotates blades 58 relative to driver plates 54, 56. In the illustrated configuration, the center of rotation of control cam 62 has been shifted aft from a concentric location 72 to an eccentric location 74. In this configuration, as each blade 58 follows the generally circular path of travel, the blades transition between positive pitch, zero pitch, negative pitch, zero pitch and back to positive pitch during each revolution of cross-flow fan assembly 52.

As illustrated, blades 58 have an airfoil cross section and travel in a counterclockwise direction as indicated by arrow 76. As blades 58 approach the forward side of cross-flow fan assembly 52 (the left side of the illustrated embodiment in FIG. 3B), the blades have progressively greater positive pitch reaching a maximum positive pitch proximate axis 78. Thereafter, as blades 58 retreat from the forward side of cross-flow fan assembly 52, the blades have progressively lesser positive pitch reaching zero pitch proximate axis 80. As blades 58 approach the aft side of cross-flow fan assembly 52, the blades have progressively greater negative pitch reaching a maximum negative pitch proximate axis 78. Thereafter, as blades 58 retreat from the aft side of cross-flow fan assembly 52, the blades have progressively lesser negative pitch, reaching zero pitch proximate axis 80. Each blade 58 repeats this cycle on each revolution of cross-flow fan assembly 52. It should be noted that while each blade 58 may have a different pitch angle at any given time, the collective positions of all blades 58 may be referred to herein as the pitch angle configuration of cross-flow fan assembly 52. Thus, movement of control cam 62 is operable to change the pitch angle configuration of blades 58 to selectively generate thrust in a range of desired magnitudes from zero (see FIG. 3B) to one hundred percent (see FIG. 3C) of the maximum thrust output, while operating cross-flow fan assembly 52 at a constant speed. Thus, even though only two pitch angle configurations of blades 58 have been shown in FIGS. 3B-3C, it should be understood by having ordinary skill in the art that blades 58 may have an infinite number of pitch angle configurations producing an infinite number of thrust magnitudes, by moving control cam 62 along an infinite number of possible points along axis 78 between its minimum location (see FIG. 3B) and its maximum location (see FIG. 3C).

Figure 4:
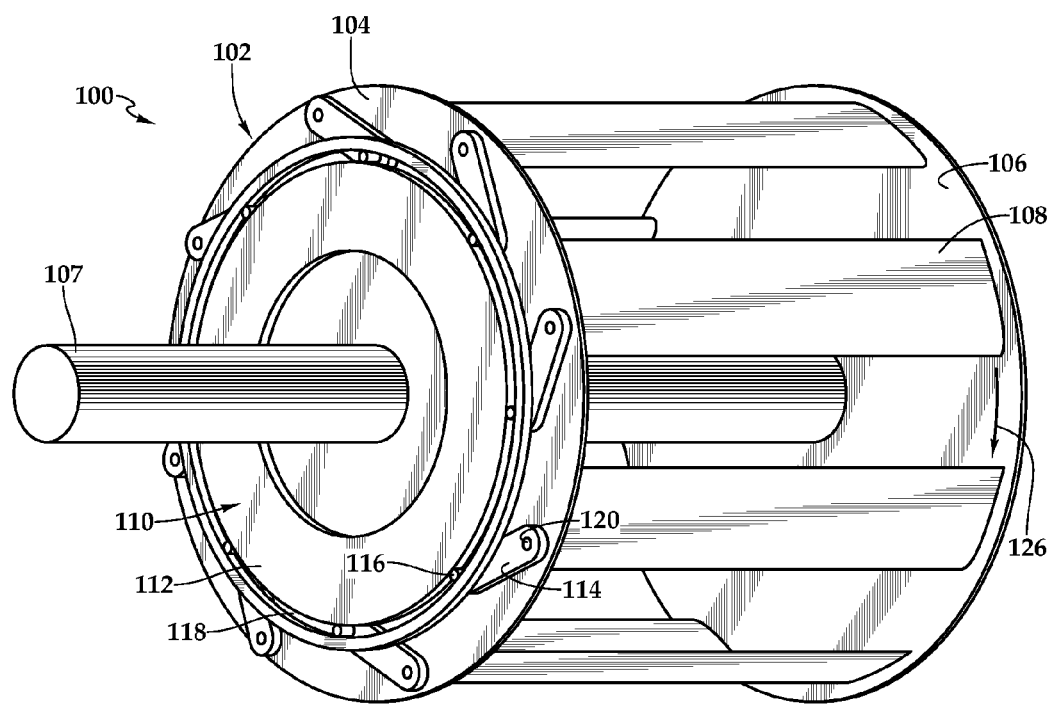
FIG. 4 is a perspective view of a variable thrust cross-flow fan system for use in an aircraft operable to generate a triaxial dynamic thrust matrix in accordance with embodiments of the present disclosure.

In the illustrated embodiment, each blade 58 forms an acute angle with respect to the linkage 64 to which it is coupled. In this configuration, when control cam 62 is shifted aft from concentric location 72 to eccentric location 74, airflow through cross-flow fan assembly 52 is from the forward side to the aft side, which generates a thrust in the forward direction, as discussed herein. The magnitude of the thrust generated by variable thrust cross-flow fan system 50 is determined by factors including the magnitude of the eccentricity applied to control cam 62, the rotational speed of cross-flow fan assembly 52, the cross sectional shape of blades 58, the pitch cycle of blades 58, the number of blades 58 and other factors known to those having ordinary skill in the art. It should be noted that the variable thrust cross-flow fan systems of the present disclosure may take a variety of forms and may operate in a variety of ways. For example, as illustrated in FIG. 4 of the drawings, a propulsion unit for use in a propulsion assembly of the present disclosure is depicted as variable thrust cross-flow fan 100. In this embodiment, variable thrust cross-flow fan 100 rotates in the clockwise direction, the blades form obtuse angles with respect to the linkages, the control cam does not rotate with the cross-flow fan assembly and the control cam is shifted in same direction in which thrust is generated.

Variable thrust cross-flow fan 100 includes a cross-flow fan assembly 102 including driver plates 104, 106 which are coupled to and are rotatable about a longitudinal axis by a drive shaft 107, which is part of a drive system used to provide rotational energy to cross-flow fan assembly 102 and is preferably coupled to an electrically operated engine controlled by the flight control system of aircraft 10. Cross-flow fan assembly 102 includes a plurality of blades 108 that are each rotatably coupled between driver plates 104, 106. As illustrated, blades 108 are disposed radially outwardly from the longitudinal axis such that blades 108 follow a generally circular path of travel when cross-flow fan assembly 102 rotates about the longitudinal axis. Variable thrust cross-flow fan 100 includes a control assembly 110 that is coupled to each blade 108. Control assembly 110 is part of an actuation system used to adjust the thrust output of cross-flow fan assembly 102 and is preferably coupled to an electrically operated actuator controlled by the flight control system of aircraft 10. In the illustrated embodiment, control assembly 110 includes a control cam 112 that is translatable relative to cross-flow fan assembly 102 but does not rotate with cross-flow fan assembly 102. Control assembly 110 also includes a plurality of linkages 114 that are slidably coupled to control cam 112 via follower pins 116 in a continuous follower slot 118 of driver plate 104 and fixably coupled to blades 108 via driver pins 120 that extend through linkage holes (not visible) of driver plate 104.

When cross-flow fan assembly 102 is rotated by drive shaft 107 and control cam 112 is positioned concentrically with cross-flow fan assembly 102, follower pins 116 move through continuous follower slot 118 in a concentric manner. In this state, blades 108 are in a neutral configuration wherein blades 108 have a substantially zero pitch during the entire revolution of cross-flow fan assembly 102. In this neutral configuration, blades 108 have a substantially zero angle of attack and therefore produce little or no thrust. To produce thrust, blades 108 are rotated relative to driver plates 104, 106 in response to shifting control cam 112 forward, in the chordwise direction of the wing, relative to cross-flow fan assembly 102. When control cam 112 is position eccentrically relative to cross-flow fan assembly 102 and cross-flow fan assembly 102 is rotated by drive shaft 107, follower pins 116 travel an eccentric path through continuous follower slot 118, which cyclically pivots linkages 114 and cyclically rotates blades 108 relative to driver plates 104, 106. In this configuration, as each blade 108 follows the generally circular path of travel, the blades transition between positive pitch, zero pitch, negative pitch, zero pitch and back to positive pitch during each revolution of cross-flow fan assembly 102, in a manner similar to that described with reference to variable thrust cross-flow fan 50. As illustrated, blades 108 have an airfoil cross section and travel in a clockwise direction as indicated by arrow 126. In addition, each blade 108 forms an obtuse angle with respect to the linkage 114 to which it is coupled. In this configuration, when control cam 112 is shifted forward from the concentric location, airflow through cross-flow fan assembly 102 is from the forward side to the aft side, which generates a thrust in the forward direction, as discussed herein.

Even though the propulsion units of the distributed propulsion system of the present disclosure have been described and depicted as variable thrust cross-flow fans, it should be understood by those having ordinary skill in the art, that other types of propulsion units could alternatively be used in the distributed propulsion system of the present disclosure including, but not limited to, axial fans. Such axial fans may include a central hub with a plurality of vanes extending radially outward therefrom. The vanes may have a leading edge, a trailing edge and an outer edge such that rotation of the vanes about the central hub generates a thrust in the desired direction. Preferably, such axial fans include an electrical motor that is powered by the electrical system of the aircraft of the present disclosure. In addition, such axial fans preferably include suitable sensors, controllers and communications such that the flight control system of the aircraft of the present disclosure is operable to individually and independently control such axial fans to produce the desired thrust.

Referring next to FIGS. 5A-5F and 6A-6E of the drawings, various maneuvers of aircraft 10 will now be described. As discussed herein, aircraft 10 preferably includes a distributed propulsion system with one propulsion unit, in the form of a variable thrust cross-flow fan, embedded within each chordwise channel of wings 14, 16, 18, as best seen in FIG. 1B. In the illustrated embodiment, each wing has five chordwise channels and thus has five propulsion units embedded therein. It should be understood by those having ordinary skill in the art that even though aircraft 10 has been depicted and described as having five propulsion units embedded in each wing, an aircraft of the present disclosure could alternatively have any number of propulsion units, both greater than or less than five, embedded in each wing. In addition, it should be understood by those having ordinary skill in the art that even though aircraft 10 has been depicted and described as having the same number of propulsion units embedded in each wing, an aircraft of the present disclosure could alternatively have different numbers of propulsion units in different wings.

Figures 6A, 6B:
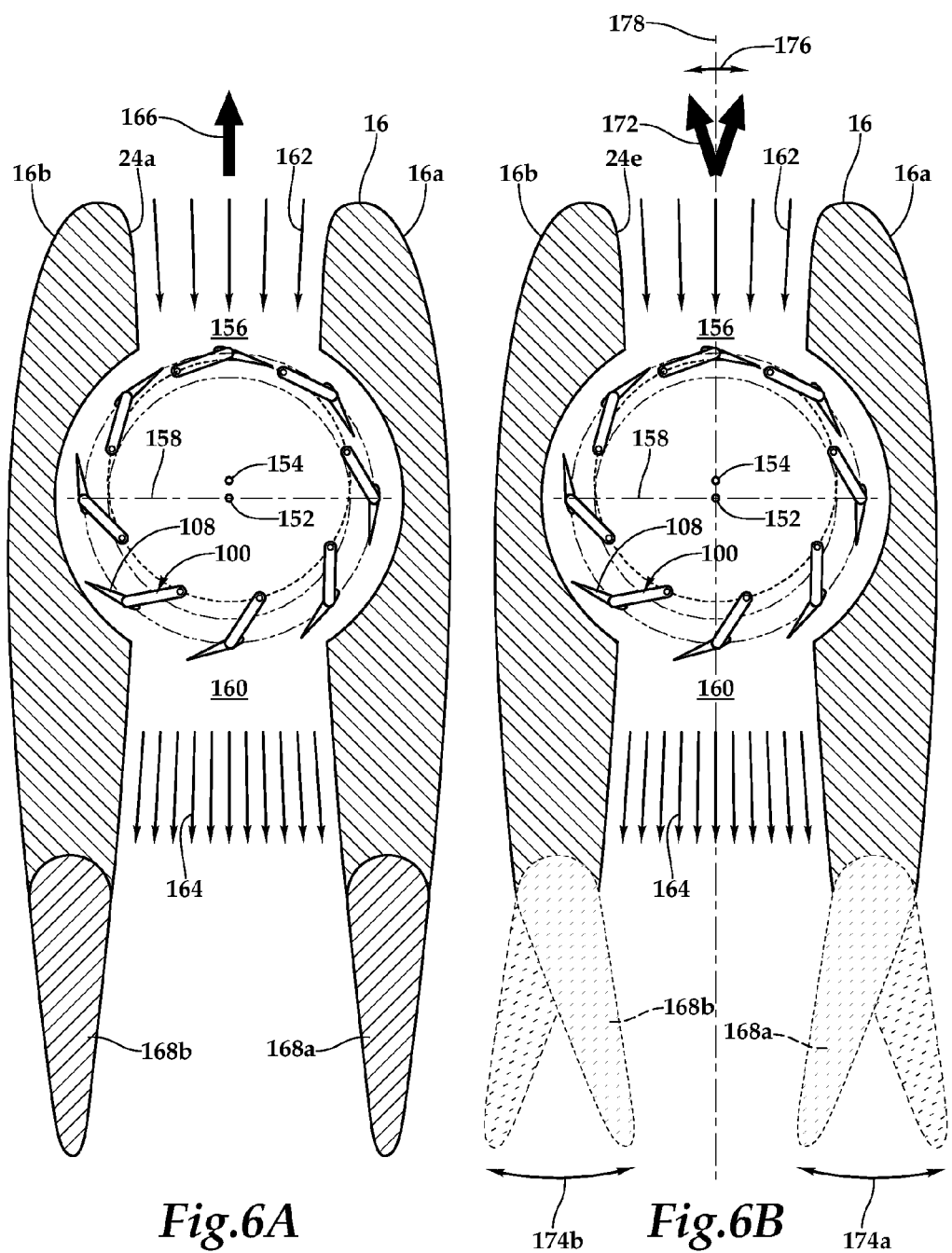

In the present disclosure, the propulsion assemblies are preferably individually and independently controlled by the flight control system of aircraft 10. For example, the flight control system is operable to control the rotational speed of each cross-flow fan assembly and the eccentricity of each control assembly during operation of each variable thrust cross-flow fan. Thus, the flight control system is operable to individually and independently control the magnitude of the thrust output of each variable thrust cross-flow fan. In addition, the flight control system is operable to control the position of flaperons located in the aft portion of each chordwise channel of wings 14, 16, 18, as best seen in FIG. 6B. The flaperons direct the airflow discharged from each variable thrust cross-flow fan enabling thrust vectoring, which makes aircraft 10 more responsive and maneuverable. Thus, the flight control system is operable to individually and independently control thrust vectoring associated with each variable thrust cross-flow fan. By individually and independently controlling the magnitude of the thrust output of each variable thrust cross-flow fan and thrust vectoring of discharge air from each variable thrust cross-flow fan, the flight control system and the distributed propulsion system generate a dynamic thrust matrix for aircraft 10. In the illustrated tri-wing embodiment of aircraft 10, the dynamic thrust matrix is a triaxial dynamic thrust matrix.

Figure 5A:
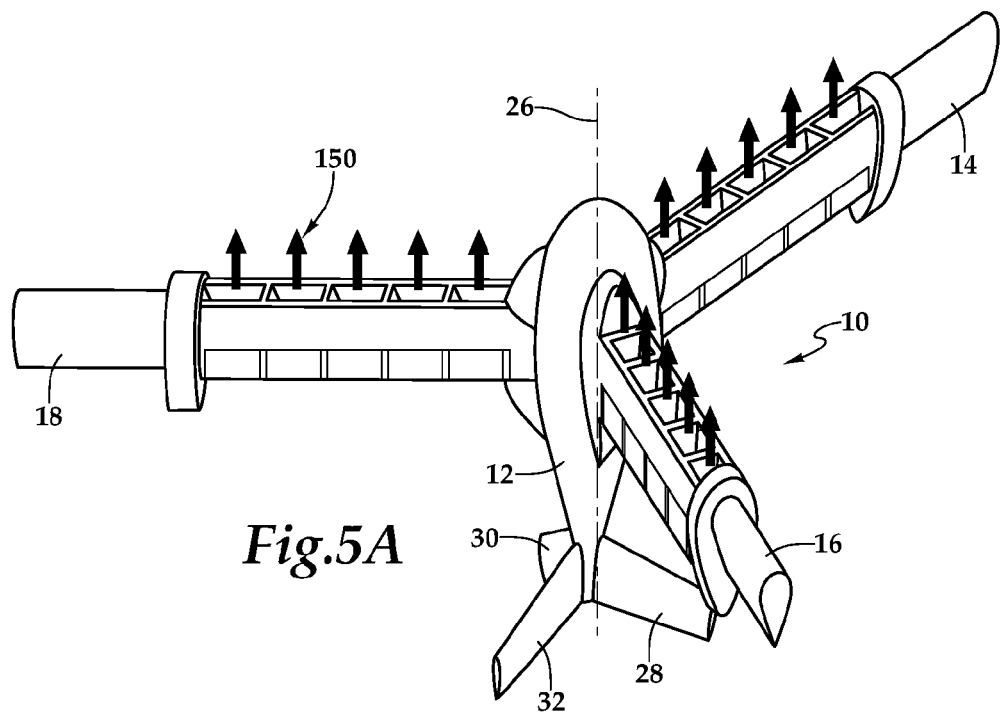

FIGS. 5A-5F show the dynamic thrust matrix of aircraft 10 in various states as indicated by the arrows extending from the leading edge of wings 14, 16, 18. For example, as best seen in FIG. 5A, aircraft 10 is in a vertical takeoff and landing mode with the longitudinal axis 26 of aircraft 10 in a generally vertical attitude. As the thrust requirement for vertical takeoff, vertical landing and hovering is high, all propulsion assemblies are operating to generate vertical thrust as indicated by the arrows, which represent the current state of the dynamic thrust matrix of aircraft 10 and may be referred to as dynamic thrust matrix configuration 150. As illustrated, the thrust magnitude for each of the fifteen propulsion assemblies is substantially the same as indicated by the size of the arrows. In addition, the thrust vectors of each of the fifteen propulsion assemblies are substantially parallel with longitudinal axis 26, as indicated by the direction of the arrows. In dynamic thrust matrix configuration 150, each of the propulsion assemblies is being operated in a substantially identical manner to produce substantially the same magnitude of thrust output with substantially the same thrust vector.

The operation of each of the propulsion assemblies in dynamic thrust matrix configuration 150 may be represented by FIG. 6A. Wing 16 of aircraft 10 is depicted in cross section through chordwise channel 24A. In the illustrated embodiment, variable thrust cross-flow fan 100 of FIG. 4 is embedded within wing 16 between upper surface 16A and lower surface 16B. In the illustrated configuration, control cam 112 (see FIG. 4) has been shifted forward from a concentric location 152 to an eccentric location 154. In this configuration, as each blade 108 follows the generally circular path of travel, the blades transition between positive pitch, zero pitch, negative pitch, zero pitch and back to positive pitch during each revolution of variable thrust cross-flow fan 100. As illustrated, blades 108 have an airfoil cross section and travel in a counterclockwise direction. As blades 108 approach forward intake 156 of chordwise channel 24A, the blades have progressively greater positive pitch reaching a maximum positive pitch proximate the forward apex. Thereafter, as blades 108 retreat from forward intake 156, the blades have progressively lesser positive pitch reaching zero pitch proximate axis 158. As blades 108 approach aft discharge 160 of chordwise channel 24A, the blades have progressively greater negative pitch reaching a maximum negative pitch proximate the aft apex. Thereafter, as blades 108 retreat from aft discharge 160, the blades have progressively lesser negative pitch, reaching zero pitch proximate axis 158. Each blade 108 repeats this cycle on each revolution of variable thrust cross-flow fan 100.

As blades 108 follow the generally circular path of travel with the cyclically varying angle of attack described herein, air passes through variable thrust cross-flow fan 100 as indicated by low-density intake airflow arrows 162 and high-density discharge airflow arrows 164 with the resultant thrust indicated by arrow 166. As discussed herein, the magnitude of thrust 166 generated by variable thrust cross-flow fan 100 is determined by factors including the magnitude of the eccentricity applied to control cam 112 and the rotational speed of variable thrust cross-flow fan 100, both of which are controlled by the flight control system of aircraft 10. Also controlled by the flight control system of aircraft 10 are flaperons 168A, 168B which are in a stationary and neutral position in FIG. 6A such that the thrust vector generated by variable thrust cross-flow fan 100 in chordwise channel 24A is substantially parallel with longitudinal axis 26 of aircraft 10, as indicated by the direction of arrow 166.

Figure 5B:
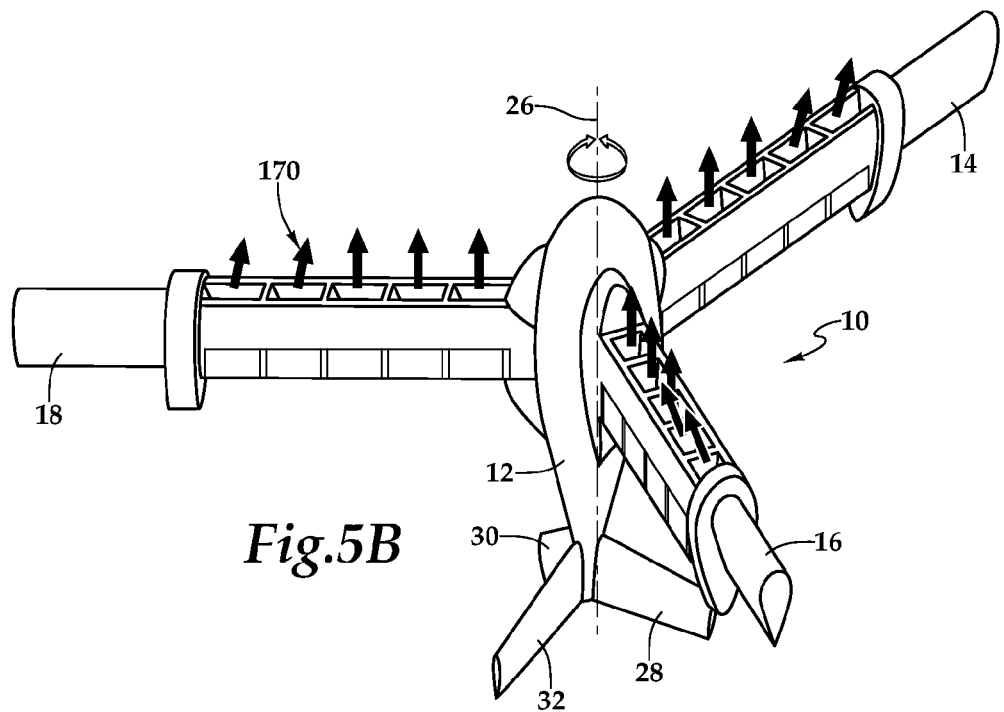

Referring particularly to FIG. 5B of the drawings, the dynamic thrust matrix of aircraft 10 is shown in a state that is beneficial in stabilizing aircraft 10 during vertical takeoff, vertical landing and hovering as represented by arrows 170. As illustrated, the thrust magnitude for each of the fifteen propulsion assemblies is substantially the same as indicated by the size of the arrows. For each wing 14, 16, 18, the flaperons are in a stationary and neutral position for the three inboard propulsion assemblies, thus not engaged in thrust vectoring. For the two outboard propulsion assemblies of each wing 14, 16, 18, however, the associated flaperons are being engaged for thrust vectoring to create a moment that is operable to rotate aircraft 10 about longitudinal axis 26 or prevent rotation of aircraft 10 about longitudinal axis 26 in response to prevailing atmospheric conditions. In this configuration, the moment created by thrust vectoring may be considered yaw control as aircraft 10 is in a vertical orientation. In dynamic thrust matrix configuration 170, each of the propulsion assemblies is being operated to produce substantially the same magnitude of thrust output in combination with thrust vectoring of the outboard propulsion assemblies.

The operation of the inboard propulsion assemblies in dynamic thrust matrix configuration 170 may be represented by FIG. 6A. The operation of the outboard propulsion assemblies in dynamic thrust matrix configuration 170 may be represented by FIG. 6B. Variable thrust cross-flow fan 100 is positioned in chordwise channel 24E of wing 16 and is operating in the manner substantially identical to that described with reference to FIG. 6A. Notably, as blades 108 follow the generally circular path of travel with the cyclically varying angle of attack described herein, air passes through variable thrust cross-flow fan 100 as indicated by low-density intake airflow arrows 162 and high-density discharge airflow arrows 164 with the resultant thrust indicated by dual arrow 172. As discussed herein, the magnitude of thrust 172 generated by variable thrust cross-flow fan 100 is determined by factors including the magnitude of the eccentricity applied to control cam 112 and the rotational speed of variable thrust cross-flow fan 100, both of which are controlled by the flight control system of aircraft 10. Also controlled by the flight control system of aircraft 10 are flaperons 168A, 168B which are shown in dashed lines indicating their movement along paths 174A, 174B, respectively, to achieve thrust vectoring. In the illustrated example, flaperons 168A, 168B are shiftable relative to upper and lower surfaces 16A, 16B to enable thrust vectoring, which is depicted as path 176 of dual arrow 172. In this case, path 176 represents thrust vectoring of between about plus and minus twenty degrees relative to a plane extending from longitudinal axis 26 spanwise through wing 16 represented as line 178. By adjusting the position of flaperons 168A, 168B along paths 174A, 174B, the flight control system of aircraft 10 is operable to stabilize aircraft 10 during vertical takeoff, vertical landing and hovering relative to rotation about longitudinal axis 26.

Figure 5C:
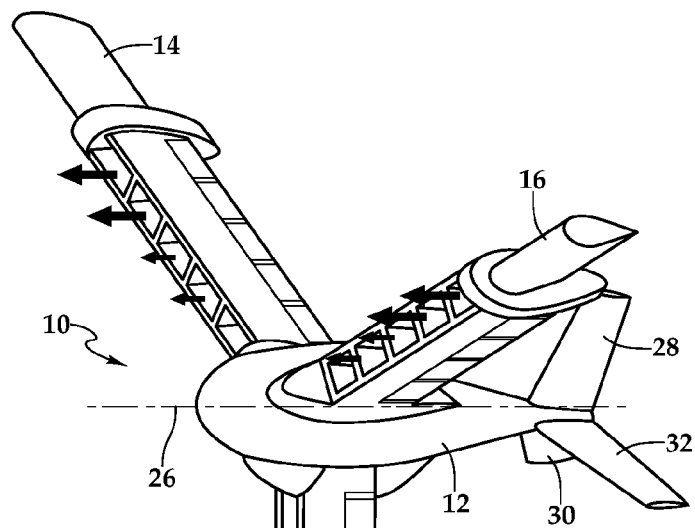

Referring particularly to FIG. 5C of the drawings, the dynamic thrust matrix of aircraft 10 is shown in a state that is beneficial in enhancing the endurance of aircraft 10 during forward flight as represented by arrows 180. As the thrust requirement for forward flight is reduced compared to vertical takeoff and landing, the thrust output of dynamic thrust matrix configuration 180 has accordingly been reduced compared to, for example, the thrust output of dynamic thrust matrix configuration 150 of FIG. 5A. As illustrated, the thrust magnitude for the outboard propulsion assemblies has been maintained at a relatively high level as indicated by the size of the outboard thrust arrows. The thrust magnitude for the midboard propulsion assemblies has been reduced to a relatively low level as indicated by the size of the midboard thrust arrows. The thrust magnitude for the inboard propulsion assemblies has been reduced to substantially zero as indicated by the lack of inboard thrust arrows. In dynamic thrust matrix configuration 180, the flaperons are in a stationary and neutral position for all fifteen propulsion assemblies producing thrust vectors that are substantially parallel with longitudinal axis 26.

The operation of the outboard propulsion assemblies in dynamic thrust matrix configuration 180 may be represented by FIG. 6C. Variable thrust cross-flow fan 100 is positioned in chordwise channel 24E of wing 16 and is operating in the manner described with reference to FIG. 6A. As blades 108 follow the generally circular path of travel with the cyclically varying angle of attack described herein, air passes through variable thrust cross-flow fan 100 as indicated by low-density intake airflow arrows 162 and high-density discharge airflow arrows 164 with the resultant thrust indicated by arrow 182.

The operation of the midboard propulsion assemblies in dynamic thrust matrix configuration 180 may be represented by FIG. 6D. Variable thrust cross-flow fan 100 is positioned in chordwise channel 24C of wing 16 and is operating in the manner described with reference to FIG. 6C with the exception that control cam 112 (see FIG. 4) has been shifted forward from concentric location 152 to an eccentric location 184 that is less than the shift forward to eccentric location 154 of FIG. 6C. As blades 108 follow the generally circular path of travel with the cyclically varying angle of attack described herein, air passes through variable thrust cross-flow fan 100 as indicated by low-density intake airflow arrows 162 and medium-density discharge airflow arrows 186 with the resultant thrust indicated by arrow 188, which is less than thrust 182 of FIG. 6C. Alternatively, reduced thrust 188 could be achieved by reducing the rotational speed of variable thrust cross-flow fan 100 in chordwise channel 24C while maintaining control cam 112 in eccentric location 154. As another alternative, reduced thrust 188 could be achieved by a combination of speed reduction and eccentricity reduction.

The operation of the inboard propulsion assemblies in dynamic thrust matrix configuration 180 may be represented by FIG. 6E. Variable thrust cross-flow fan 100 is positioned in chordwise channel 24A of wing 16 and is operating in the manner described with reference to FIG. 6C with the exception that control cam 112 (see FIG. 4) is positioned in concentric location 152. In this state, blades 108 are in a neutral configuration wherein blades 108 have a substantially zero pitch during the entire revolution of variable thrust cross-flow fan 100. In this neutral configuration, blades 108 have a substantially zero angle of attack and therefore produce little or no thrust. Nonetheless, air passes through variable thrust cross-flow fan 100 as indicated by low-density intake airflow arrows 162 and low-density discharge airflow arrows 190. It is noted that rotating variable thrust cross-flow fan 100 in the no thrust configuration during flight is preferred to shutting down variable thrust cross-flow fan 100 as a nonrotating unit generates an undesirable drag force while a rotating unit allows for suitable airflow therethrough, as shown in FIG. 6E. The rotating speed of a non thrust-producing unit can be optimized for passive airflow therethrough by the flight control system of aircraft 10.

Figure 5D:
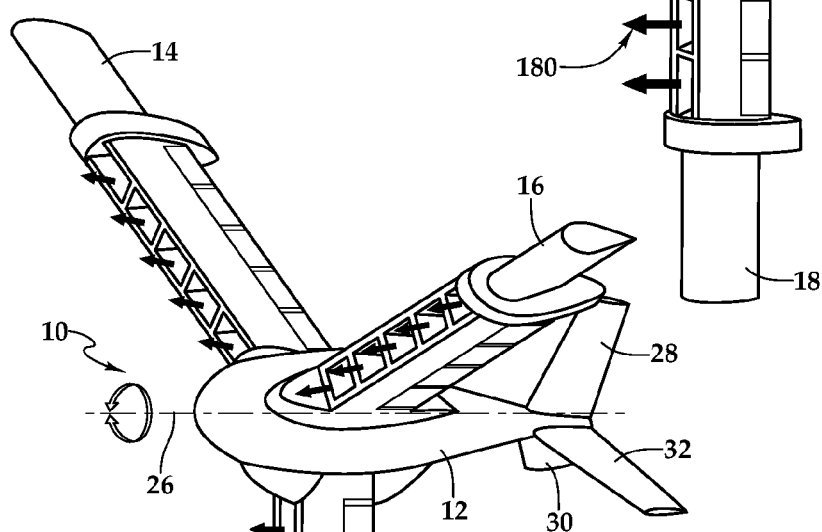

Referring now to FIG. 5D of the drawings, the dynamic thrust matrix of aircraft 10 is shown in a state that is beneficial in enhancing the endurance of aircraft 10 during forward flight as represented by arrows 192. As the thrust requirement for forward flight is reduced compared to vertical takeoff and landing, the thrust output of dynamic thrust matrix configuration 192 has accordingly been reduced compared to, for example, the thrust output of dynamic thrust matrix configuration 150 of FIG. 5A. As illustrated, the thrust magnitude of all fifteen propulsion assemblies has been reduced to a relatively low level as indicated by the size of the thrust arrows. In dynamic thrust matrix configuration 192, the flaperons of wing 18 are in a stationary and neutral position producing thrust vectors that are substantially parallel with longitudinal axis 26. The flaperons of wings 14, 16, 18, however, are being engaged for thrust vectoring to create a moment that is operable to rotate and/or control rotation of aircraft 10 about longitudinal axis 26. In this configuration, the moment created by thrust vectoring may be considered roll control as aircraft 10 is in a horizontal orientation. In dynamic thrust matrix configuration 192, each of the propulsion assemblies is being operated to produce substantially the same magnitude of thrust output in combination with thrust vectoring of the propulsion assemblies of wings 14, 16. It is noted that during forward flight, rudder 28 is operable for yaw control and elevators 30, 32 are operable for pitch control, in the illustrated configuration.

The operation of the propulsion assemblies in dynamic thrust matrix configuration 192 may be best represented in FIG. 6D, with reference to FIG. 6B. Variable thrust cross-flow fan 100 is positioned in chordwise channel 24C of wing 16 and is operating in the manner described herein with control cam 112 (see FIG. 4) shifted forward from concentric location 152 to an eccentric location 184. As blades 108 follow the generally circular path of travel with the cyclically varying angle of attack described herein, air passes through variable thrust cross-flow fan 100 as indicated by low-density intake airflow arrows 162 and medium-density discharge airflow arrows 186 with the resultant thrust indicated by arrow 188. During thrust vectoring for role stabilization, the flight control system of aircraft 10 may adjust the position of flaperons 168A, 168B of wings 14, 16 along paths 174A, 174B as described with reference to FIG. 6B.

Referring now to FIG. 5E of the drawings, the dynamic thrust matrix of aircraft 10 is shown in a state that is beneficial in transitioning from vertical takeoff and landing mode to forward flight mode as represented by arrows 194. As illustrated, the thrust magnitude of the propulsion assemblies in wings 14, 16 has been maintained at a relatively high level while the thrust magnitude of the propulsion assemblies in wings 18 has been reduced to a relatively low level as indicated by the size of the respective thrust arrows. In dynamic thrust matrix configuration 194, the flaperons of wing 18 are in a stationary and neutral position producing thrust vectors that are substantially parallel with longitudinal axis 26. The flaperons of wings 14, 16, however, are being engaged for thrust vectoring to create a moment that is operable to rotate aircraft 10 about its center of gravity, moving wing 18 toward a low wing position as indicated by the arrow crossing axis 26. It is noted that the use of thrust vectoring enhances the maneuverable of aircraft 10 during transitions from vertical takeoff and landing mode to forward flight mode. The operation of the propulsion assemblies in wings 14, 16 in dynamic thrust matrix configuration 194 may be represented by FIG. 6B. Likewise, the operation of the propulsion assemblies in wing 18 may be represented by FIG. 6D.

Referring now to FIG. 5F of the drawings, the dynamic thrust matrix of aircraft 10 is shown in a state that is beneficial in transitioning from forward flight mode to vertical takeoff and landing mode as represented by arrows 196. As illustrated, the thrust magnitude of the propulsion assemblies in wings 14, 16 is set to a relatively low level while the thrust magnitude of the propulsion assemblies in wings 18 has been increased to a relatively high level as indicated by the size of the respective thrust arrows. In dynamic thrust matrix configuration 196, the flaperons of wing 18 are in a stationary and neutral position producing thrust vectors that are substantially parallel with longitudinal axis 26. The flaperons of wings 14, 16, however, are being engaged for thrust vectoring to create a moment that is operable to rotate aircraft 10 about its center of gravity, moving wing 18 toward a high wing position. It is noted that the use of thrust vectoring enhances the maneuverable of aircraft 10 during transitions from forward flight mode to vertical takeoff and landing mode. The operation of the propulsion assemblies in wings 14, 16 in dynamic thrust matrix configuration 196 may be represented by FIG. 6D, with reference to FIG. 6B. Likewise, the operation of the propulsion assemblies in wing 18 may be represented by FIG. 6C.

Figure 5G:
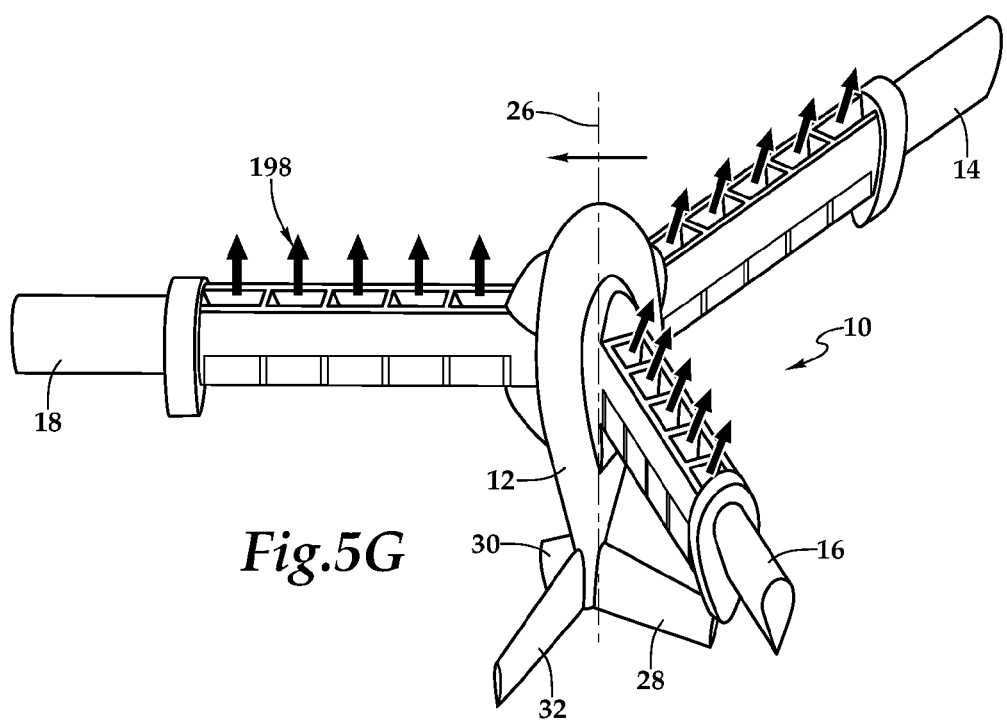

Referring particularly to FIG. 5G of the drawings, the dynamic thrust matrix of aircraft 10 is shown in a state that is beneficial in lateral transitions of aircraft 10 during vertical takeoff, vertical landing and hovering as represented by arrows 198. As illustrated, the thrust magnitude for each of the fifteen propulsion assemblies is substantially the same as indicated by the size of the arrows. In dynamic thrust matrix configuration 198, the flaperons of wing 18 are in a stationary and neutral position producing thrust vectors that are substantially parallel with longitudinal axis 26. The flaperons of wings 14, 16, however, are being engaged for thrust vectoring to create a lateral force operable to move aircraft 10 in the direction indicated by the arrow above aircraft 10. The operation of the propulsion assemblies of wing 18 in dynamic thrust matrix configuration 198 may be represented by FIG. 6A. The operation of the propulsion assemblies of wings 14, 16 may be represented by FIG. 6B.

Figure 7:
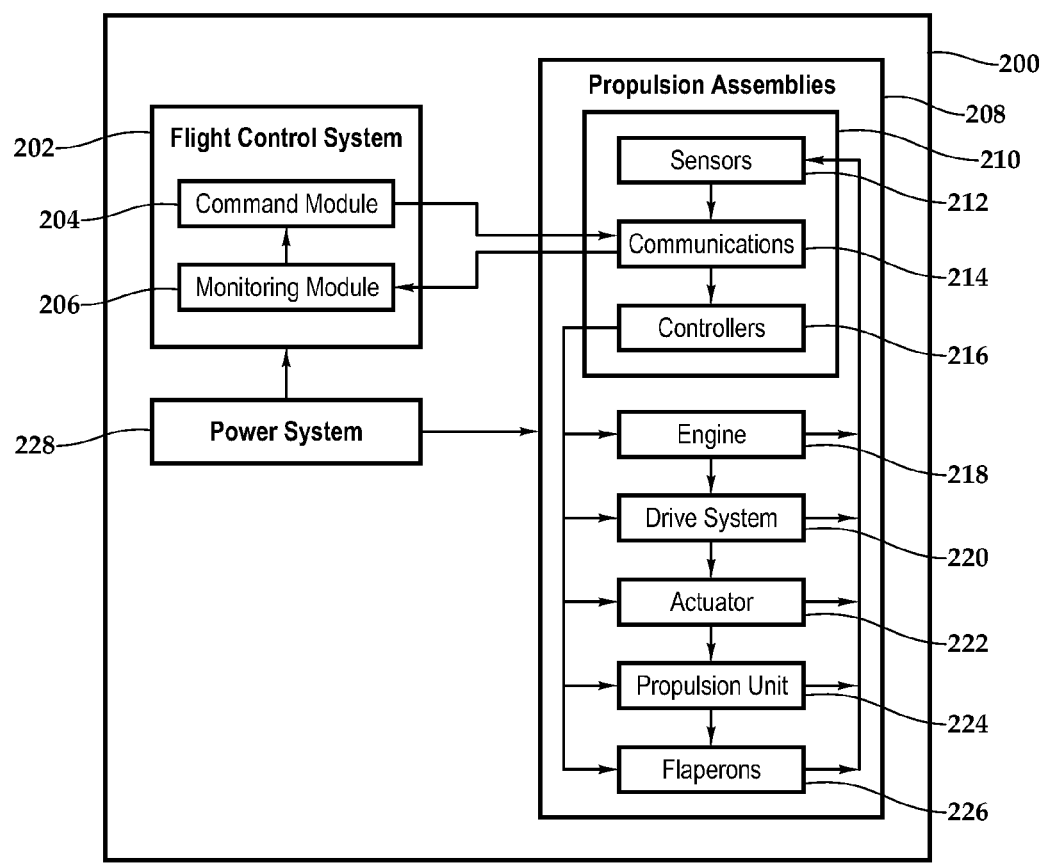
FIG. 7 is a system diagram of an aircraft operable to generate a triaxial dynamic thrust matrix in accordance with embodiments of the present disclosure.

Referring to FIG. 7 in the drawings, a systems diagram of an aircraft operable to generate a triaxial dynamic thrust matrix of the present disclosure is generally designated 200. As discussed herein, the aircraft of the present disclosure may be operated autonomously responsive to commands generated by a flight control system 202 such as a digital flight control system that preferably includes a non-transitory computer readable storage medium including a set of computer instructions executable by a processor. Flight control system 202 may be implemented on a general-purpose computer, a special purpose computer or other machine with memory and processing capability. For example, flight control system 202 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 202 may be a microprocessor-based system operable to execute program code in the form of machine-executable instructions. In addition, flight control system 202 may be selectively connectable to other computer systems via a proprietary encrypted network, a public encrypted network, the Internet or other suitable communication network that may include both wired and wireless connections.

In the illustrated embodiment, flight control system 202 includes a command module 204 and a monitoring module 206. It is to be understood by those having ordinary skill in the art that these and other modules executed by flight control system 202 may be implemented in a variety of forms including hardware, software, firmware, special purpose processors and combinations thereof. Flight control system 202 receives input from a variety of sources including internal sources such as the plurality of propulsion assemblies that are collectively references as 208 in FIG. 7. Flight control system 202 may also receive input from external sources such as local or remote command and control systems, global positioning systems, other local or remote systems and the like.

In the illustrated embodiment, each of the propulsion assemblies 208 includes an electronic node 210 having components including sensors 212, communications 214 and controllers 216. In addition, each of the propulsion assemblies 208 includes an engine 218, a drive system 220, an actuator 222, a propulsion unit 224 and flaperons 226. Each engine 218 may preferably be an electric motor operated responsive electrical power supplied by a common power system 228 or a distributed power system including a plurality of batteries. Alternatively, engines 218 may be hydraulic motors operated responsive to a common or distributed hydraulic fluid system wherein one or more high pressure hydraulic sources provide power to engines 218. As another alternative, engines 218 may be liquid fuel powered engines such as gasoline, jet fuel or diesel powered engines. Each drive system 220 mechanically couples an engine 218 to a propulsion unit 224. Drive systems 220 may be direct drive systems or may include reduction drive transmissions or the like. Drive systems 220 include drive shafts that couple to propulsion units 224 such as drive shaft 57 (see FIGS. 3A-3C) and drive shaft 107 (see FIG. 4) discussed herein. Each actuator 222 is coupled to a control assembly of a propulsion unit 224 and is operable to shift the control assembly between concentric and eccentric positions to enable the variable thrust capabilities of the propulsion units 224. Preferably, actuators 222 are linear or rotary actuators coupled to a control assembly such as control assembly 60 (see FIGS. 3A-3C) and control assembly 110 (see FIG. 4) discussed herein. Propulsion units 224 are preferably variable thrust cross-flow fans such as variable thrust cross-flow fan 50 (see FIGS. 3A-3C) and variable thrust cross-flow fan 100 (see FIG. 4) discussed herein. Flaperons 226 are operable to enable thrust vectoring and preferably operate in the manner described with reference to flaperons 168A, 168B in FIG. 6B.

In one operational example, flight control system 202 may receive a mission from an external source such as a command and control system. Thereafter, flight control system 202 may autonomously control all aspects of flight of an aircraft 10 of the present disclosure. During the various operating modes of aircraft 10 including vertical takeoff and landing mode, hovering mode, forward flight mode and transitions therebetween, command module 204 provides commands to controllers 216 to establish the desired dynamic thrust matrix configuration as discussed herein. For example, these commands may include rotational speed for engines 218, positions of actuators 222 and position of flaperons 226 for each propulsion assembly 208. Flight control system 202 receives feedback from sensors 212 that are associated with the various components of each propulsion assembly 208. This feedback is processes by monitoring module 206, which supplies correction data and other information to command module 204. Monitoring module 206 preferably receives and processes information from additional aircraft sensors (not pictures), such as positioning sensors, attitude sensors, speed sensors, environmental sensors, fuel sensors, temperature sensors, location sensors and the like. Monitoring module 206 provides the processed information to command module 204 to further enhance autonomous flight control capabilities. In some embodiments, some or all of the autonomous control capability of flight control system 202 may be augmented or supplanted by remote flight control from a command and control station via a communication link, such as a wireless communication channel. Alternatively or additionally, some or all of the autonomous and/or remote flight control of flight control system 202 may be augmented or supplanted by onboard pilot flight control in manned embodiments.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:
1. An aircraft comprising:
a fuselage having a longitudinally extending fuselage axis;
three wings extending from and circumferentially distributed about the fuselage at approximately 120-degree intervals, each wing having an airfoil cross-section including first and second surfaces and having leading and trailing edges with a chordwise channel extending between the leading and trailing edges such that the leading edge forms a forward air intake of the chord- wise channel and the trailing edge forms an aft air discharge of the chordwise channel;
a distributed propulsion system including a plurality of propulsion assemblies, each propulsion assembly including a propulsion unit disposed within one of the chordwise channels of one of the wings between the forward air intake and the aft air discharge; and
a flight control system operably associated with the distributed propulsion system.

2. The aircraft as recited in claim 1 wherein the at least three wings extend generally radially outwardly from the fuselage axis.

3. The aircraft as recited in claim 1 wherein the propulsion units further comprise cross-flow fans.

4. The aircraft as recited in claim 1 wherein the propulsion units further comprise variable thrust cross-flow fans.

5. The aircraft as recited in claim 4 wherein each of the variable thrust cross-flow fans further comprises:
a cross-flow fan assembly having a longitudinal axis and including first and second driver plates having a plurality of blades rotatably mounted therebetween, the plurality of blades disposed radially outwardly from the longitudinal axis such that the plurality of blades have a generally circular path of travel when the cross-flow fan assembly rotates about the longitudinal axis, the plurality of blades moveable between a plurality of pitch angle configurations; and
a control assembly coupled to the plurality of blades, the control assembly operable to change the pitch angle configuration of the plurality of blades to generate variable thrust.

6. The aircraft as recited in claim 1 wherein the propulsion units further comprise electrically powered propulsion units.

7. The aircraft as recited in claim 1 wherein the distributed propulsion system further comprises at least two propulsion units disposed within the chordwise channels of each wing.

8. The aircraft as recited in claim 1 wherein the flight control system and the distributed propulsion system are operable to generate a dynamic thrust matrix.

9. The aircraft as recited in claim 8 wherein the dynamic thrust matrix further comprise a triaxial dynamic thrust matrix.

10. The aircraft as recited in claim 8 wherein the dynamic thrust matrix further comprises a thrust magnitude and a thrust vector of each propulsion unit.

11. The aircraft as recited in claim 8 wherein adjustments to the dynamic thrust matrix are operable to transition the aircraft between a vertical takeoff and landing mode and a forward flight mode.

12. The aircraft as recited in claim 8 wherein adjustments to the dynamic thrust matrix are operable to maintain the aircraft in a stable hover and to perform lateral transitions in vertical takeoff and landing mode.

13. The aircraft as recited in claim 8 wherein adjustments to the dynamic thrust matrix are operable to provide roll control during forward flight.

14. The aircraft as recited in claim 8 wherein adjustments to the dynamic thrust matrix are operable to enhance aircraft endurance during forward flight.

15. A tri-wing aircraft comprising:
a fuselage having a longitudinally extending fuselage axis;
three wings extended generally radially outwardly from the fuselage axis and circumferentially distributed generally uniformly about the fuselage at approximately 120-degree intervals, each wing having an airfoil cross-section including first and second surfaces and having leading and trailing edges with a chordwise channel extending between the leading and trailing edges such that the leading edge forms a forward air intake of the chordwise channel and the trailing edge forms an aft air discharge of the chordwise channel;
a distributed propulsion system including a plurality of propulsion assemblies, each propulsion assembly including a variable thrust cross-flow fan disposed within one of the chordwise channels of one of the wings between the forward air intake and the aft air discharge with at least two variable thrust cross-flow fans disposed within the chordwise channels of each of the wings; and
a flight control system operably associated with the distributed propulsion system such that the flight control system and the distributed propulsion system are operable to generate a triaxial dynamic thrust matrix.

16. The aircraft as recited in claim 15 wherein each of the variable thrust cross-flow fans further comprises:
a cross-flow fan assembly having a longitudinal axis and including first and second driver plates having a plurality of blades rotatably mounted therebetween, the plurality of blades disposed radially outwardly from the longitudinal axis such that the plurality of blades have a generally circular path of travel when the cross-flow fan assembly rotates about the longitudinal axis, the plurality of blades moveable between a plurality of pitch angle configurations; and
a control assembly coupled to the plurality of blades, the control assembly operable to change the pitch angle configuration of the plurality of blades to generate variable thrust.

17. The aircraft as recited in claim 15 wherein the variable thrust cross-flow fans of the distributed propulsion system further comprise electrically powered variable thrust cross-flow fans.

18. The aircraft as recited in claim 15 wherein the triaxial dynamic thrust matrix further comprises a thrust magnitude and a thrust vector of each propulsion assembly.

19. The aircraft as recited in claim 15 wherein adjustments to the triaxial dynamic thrust matrix are operable to transition the aircraft between a vertical takeoff and landing mode and a forward flight mode, maintain the aircraft in a stable hover, perform lateral transitions in vertical takeoff and landing mode, provide roll control during forward flight and enhance aircraft endurance during forward flight.

* * * * *